(12) United States Patent
Kim et al.

(10) Patent No.: US 8,365,627 B2
(45) Date of Patent: Feb. 5, 2013

(54) SHIFTING APPARATUS FOR DOUBLE CLUTCH TRANSMISSION

(75) Inventors: Jongyop Kim, Seoul (KR); Sungyong Cho, Hwaseong-si (KR); Hyunduk Chang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 595 days.

(21) Appl. No.: 12/622,196

(22) Filed: Nov. 19, 2009

(65) Prior Publication Data

US 2011/0023649 A1 Feb. 3, 2011

(30) Foreign Application Priority Data

Jul. 28, 2009 (KR) ........................ 10-2009-0068802

(51) Int. Cl.
*B60K 20/00* (2006.01)
(52) U.S. Cl. .......................... 74/337.5; 74/330; 74/473.3
(58) Field of Classification Search .................... 74/330, 74/337.5, 473.3, 473.32, 473.33
See application file for complete search history.

(56) References Cited

U.S. PATENT DOCUMENTS

| | | | | |
|---|---|---|---|---|
| 4,911,031 A | * | 3/1990 | Yoshimura et al. | 74/335 |
| 5,150,629 A | * | 9/1992 | Morris et al. | 74/337.5 |
| 6,755,089 B2 | | 6/2004 | Hirt | |
| 7,093,512 B2 | | 8/2006 | Ibamoto et al. | |
| 7,311,015 B2 | * | 12/2007 | Kluge | 74/337.5 |
| 7,350,432 B2 | * | 4/2008 | Somschor et al. | 74/335 |
| 7,487,691 B2 | | 2/2009 | Kapp et al. | |
| 2006/0117892 A1 | * | 6/2006 | Ebenhoch et al. | 74/473.1 |

FOREIGN PATENT DOCUMENTS

| | | |
|---|---|---|
| JP | 2007-285363 A | 11/2007 |
| JP | 2008-45664 A | 2/2008 |
| JP | 2008-215437 A | 9/2008 |
| KR | 10-2008-0080429 A | 9/2008 |
| KR | 10-2009-0021448 A | 3/2009 |
| KR | 10-2009-0040074 A | 4/2009 |

* cited by examiner

*Primary Examiner* — Ha D. Ho
(74) *Attorney, Agent, or Firm* — Morgan, Lewis & Bockius LLP (57) ABSTRACT

A shifting apparatus for a double clutch transmission may include a plurality of odd-numbered stage driven-shift elements, a plurality of even-numbered stage driven-shift elements, odd-numbered stage driving-shift elements that are provided to selectively move straight any one of the odd-numbered stage driven-shift elements, even-numbered stage driving-shift elements provided to selectively move straight any one of the even-numbered stage driven-shift elements, an odd-numbered stage selecting actuator that supplies the straight motion path to the odd-numbered stage driving-shift elements, an odd-numbered stage shifting actuator that supplies the rotary motion path to the odd-numbered stage driving-shift elements, an even-numbered stage selecting actuator that supplies the straight motion path to the even-numbered stage driving-shift elements, and an even-numbered stage shifting actuator that supplies the rotary motion path to the even-numbered stage driving-shift elements.

10 Claims, 6 Drawing Sheets

SHIFTING APPARATUS FOR DOUBLE CLUTCH TRANSMISSION

CROSS-REFERENCE TO RELATED APPLICATIONS

The present application claims priority to Korean Patent Application Number 10-2009-0068802 filed Jul. 28, 2009, the entire contents of which application is incorporated herein for all purposes by this reference.

BACKGROUND OF THE INVENTION

1. Field of the Invention

The present invention relates to a shifting apparatus for a double clutch transmission, particularly a shifting apparatus that selectively engages a predetermined shift stage of a plurality of shift stages in a double clutch transmission.

2. Description of Related Art

Double clutch transmissions, different from a single clutch transmission systems of the related art, are shifting systems equipped with two clutches and designed to form separate shifting lines while one clutch connects/disconnects the gears of the odd-numbered stages and the other clutch connects/disconnects the gears of the even-numbered stages, which facilitate driving, such as automatic transmission, and achieve larger improvement of fuel efficiency than manual transmissions.

Further, double clutch transmissions allow for smooth shifting, because disconnection of acceleration, chattering and difference when gears are engaged, which are generated in transmissions equipped with a single clutch, do not occur.

The double clutch transmissions should be provided with a pre-select function that engages in advance a shift gear of a shift stage in a next desired shift line other than the present shift stage, in order to shift only by changing the operation of the two clutches.

On the other hand, when shift stages in one shift line is selected at the same time, the shift stages are locked, that is, interlocked, in which driving is impossible, such that an interlock prevention function should be provided to prevent the above situation.

Further, in addition to including the necessary functions described above, the shift device of double clutch transmissions should ensure a low manufacturing cost with simple structure and operational mechanism, quick and accurate operability, and a compact configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shifting apparatus for a double clutch transmission which achieves a pre-select function that performs shifting only by converting engagement and disengagement of two clutches while engaging two shift stages in different shift lines at the same time, and an interlock prevention function that prevents two or more shift stages in one shift line from being simultaneously engaged, ensures quick and accurate operation with a simple structure and a compact configuration, and can be easily mounted with the compact configuration in a vehicle.

In an aspect of the present invention, the shifting apparatus for a double clutch transmission that divides a plurality of shift stages having different gear ratios into integer number of continuous shift stages in accordance with the order of the gear ratios, may include a plurality of odd-numbered stage driven-shift elements that makes engagement or disengagement at odd-numbered shift stages by straight strokes; a plurality of even-numbered stage driven-shift elements that makes engagement or disengagement at even-numbered shift stages by straight strokes; odd-numbered stage driving-shift elements that are provided to selectively move straight any one of the odd-numbered stage driven-shift elements by a rotational motion path or a straight motion path perpendicularly crossing each other; even-numbered stage driving-shift elements that are disposed rotatably and coaxially with the odd-numbered stage driving-shift elements and provided to selectively move straight any one of the even-numbered stage driven-shift elements by a rotational motion path or a straight motion path perpendicularly crossing each other; an odd-numbered stage selecting actuator that supplies the straight motion path to the odd-numbered stage driving-shift elements; an odd-numbered stage shifting actuator that supplies the rotary motion path to the odd-numbered stage driving-shift elements; an even-numbered stage selecting actuator that supplies the straight motion path to the even-numbered stage driving-shift elements; and an even-numbered stage shifting actuator that supplies the rotary motion path to the even-numbered stage driving-shift elements.

The shifting apparatus for a double clutch transmission may further include an odd-numbered stage driving rod that is provided with the odd-numbered stage driving-shift elements and receives the straight motion path from the odd-numbered stage selecting actuator and the rotary motion path from the odd-numbered stage shifting actuator; an even-numbered stage driving pipe that is rotatably and coaxially fitted on the outer surface of the odd-numbered stage driving rod, receives the straight motion path from the even-numbered stage selecting actuator and the rotary motion path from the even-numbered stage shifting actuator, and has the even-numbered stage driving-shift elements; an odd-numbered stage selecting-converting member coupled to the odd-numbered stage selecting actuator and the odd-numbered stage driving rod such that the odd-numbered stage selecting-converting member converts driving motion of the odd-numbered stage selecting actuator into the straight motion path of the odd-numbered stage driving rod; an odd-numbered stage shifting-converting member coupled to the odd-numbered stage shifting actuator and the odd-numbered stage driving rod such that the odd-numbered stage shifting-converting member converts driving motion of the odd-numbered stage shifting actuator into the rotational motion path of the odd-numbered stage driving rod; an even-numbered stage selecting-converting member coupled to the even-numbered stage selecting actuator and the even-numbered stage driving pipe such that the even-numbered stage selecting-converting member converts driving motion of the even-numbered stage selecting actuator into the straight motion path of the even-numbered stage driving pipe; and an even-numbered stage shifting-converting member coupled to the even-numbered stage shifting actuator and the even-numbered stage driving pipe such that the even-numbered stage shifting-converting member converts driving motion of the even-numbered stage shifting actuator into the rotational motion path of the even-numbered stage driving pipe.

The odd-numbered stage selecting actuator may be implemented by a straight reciprocating member providing a straight stroke between two positions, the odd-numbered stage selecting-converting member may include an odd-numbered stage rotating link that is rotated by the straight stroke of the odd-numbered stage selecting actuator and an odd-numbered stage selecting guide that makes a straight stroke of the odd-numbered stage driving rod by receiving rotational motion of the odd-numbered stage rotating link, the odd-numbered stage shifting actuator is implemented by a motor generating rotational force, the odd-numbered stage shifting-converting member includes an odd-numbered stage shifting screw that is rotated by rotational force of the odd-numbered stage shifting actuator, an odd-numbered stage shifting-moving nut engaged with the odd-numbered stage shifting screw and moved straight by rotational motion of the odd-numbered stage shifting screw, and an odd-numbered stage shifting protrusion that is provided to the odd-numbered stage driving rod and inserted in the odd-numbered stage shifting-moving nut such that the odd-numbered stage driving rod is rotated by straight motion of the odd-numbered stage shifting-moving nut.

The odd-numbered stage selecting guide and the odd-numbered stage shifting protrusion may protrude from the odd-numbered stage driving rod while being integrally formed with each other, and are fitted on the outer surface of the odd-numbered stage driving rod.

The odd-numbered stage selecting guide and the odd-numbered stage shifting protrusion may be aligned symmetric in a circumferential direction with respect to the center axis of the odd-numbered stage driving rod.

The even-numbered stage selecting actuator may be implemented by a straight reciprocating member providing a straight stroke between two positions, the even-numbered stage selecting-converting member may include an even-numbered stage rotating link that is rotated by the straight stroke of the even-numbered stage selecting actuator and an even-numbered stage selecting guide that makes a straight stroke of the even-numbered stage driving pipe by receiving rotational motion of the even-numbered stage rotating link, the even-numbered stage shifting actuator is implemented by a motor generating rotational force, the even-numbered stage shifting-converting member includes an even-numbered stage shifting screw that is rotated by rotational force of the even-numbered stage shifting actuator, an even-numbered stage shifting-moving nut engaged with the even-numbered stage shifting screw and moved straight by rotational motion of the even-numbered stage shifting screw, and an even-numbered stage shifting protrusion that is provided to the even-numbered stage driving pipe and inserted in the even-numbered stage shifting-moving nut such that the even-numbered stage driving pipe is rotated by straight motion of the even-numbered stage shifting-moving nut.

The even-numbered stage selecting guide and the even-numbered stage shifting protrusion may protrude from the even-numbered stage driving pipe and are integrally formed with the even-numbered stage driving pipe.

The even-numbered stage selecting guide and the even-numbered stage shifting protrusion may be aligned symmetric in a circumferential direction with respect to the center axis of the even-numbered stage driving pipe.

The odd-numbered stage driving-shift element may include a finger that is fitted on the outer surface of the odd-numbered stage driving rod while protruding radially from the odd-numbered stage driving rod, and inserted in the odd-numbered stage driven-shift element, and an interlock preventing portion that protrudes radially from the odd-numbered stage driving rod integrally with the finger and restrains a straight stroke of other odd-numbered stage driven-shift elements that are not selected by the finger when finger is shifted.

The even-numbered stage driving-shift element may include a finger that protrudes integrally and radially from the even-numbered stage driving pipe and is inserted in the even-numbered stage driven-shift element, and an interlock preventing portion that protrudes integrally and radially from the even-numbered stage driving pipe to restrain a straight stroke of other even-numbered stage shifting elements that are not selected by the finger.

In various aspect, the present invention makes it possible to achieve a pre-select function that performs shifting only by converting engagement and disengagement of two clutches while engaging two shift stages in different shift lines at the same time, and an interlock prevention function that prevents two or more shift stages in one shift line from being simultaneously engaged, ensure quick and accurate operation with a simple structure and a compact configuration, and easily mounted with the compact configuration in a vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A shifting apparatus of a double clutch transmission according to an exemplary embodiment of the present invention divides a plurality of shift stages having different gear ratios into integer number of continuous shift stages in accordance with the order of the gear ratios.

That is, a plurality of shift stages that can be achieved in the double clutch transmission is divided into continuous integer number of shift stages composed of first shift stage to N-th shift stage in the order of gear ratio, odd-numbered stages and even-numbered stages which are described below are divided on the basis of the order.

Figure 1:
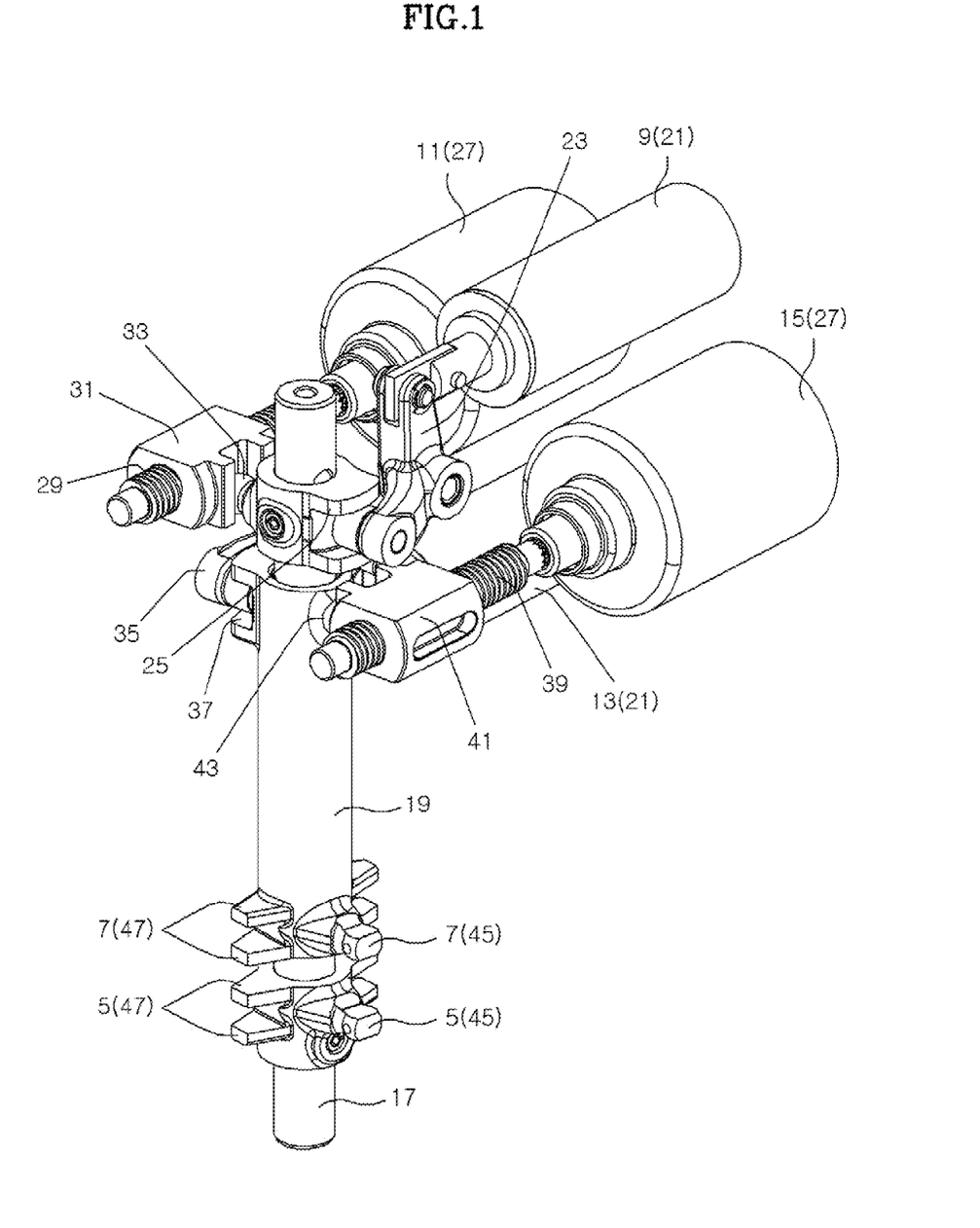
FIG. 1 is a view illustrating a shifting apparatus for a double clutch transmission according to an exemplary embodiment of the present invention.
Figure 2:
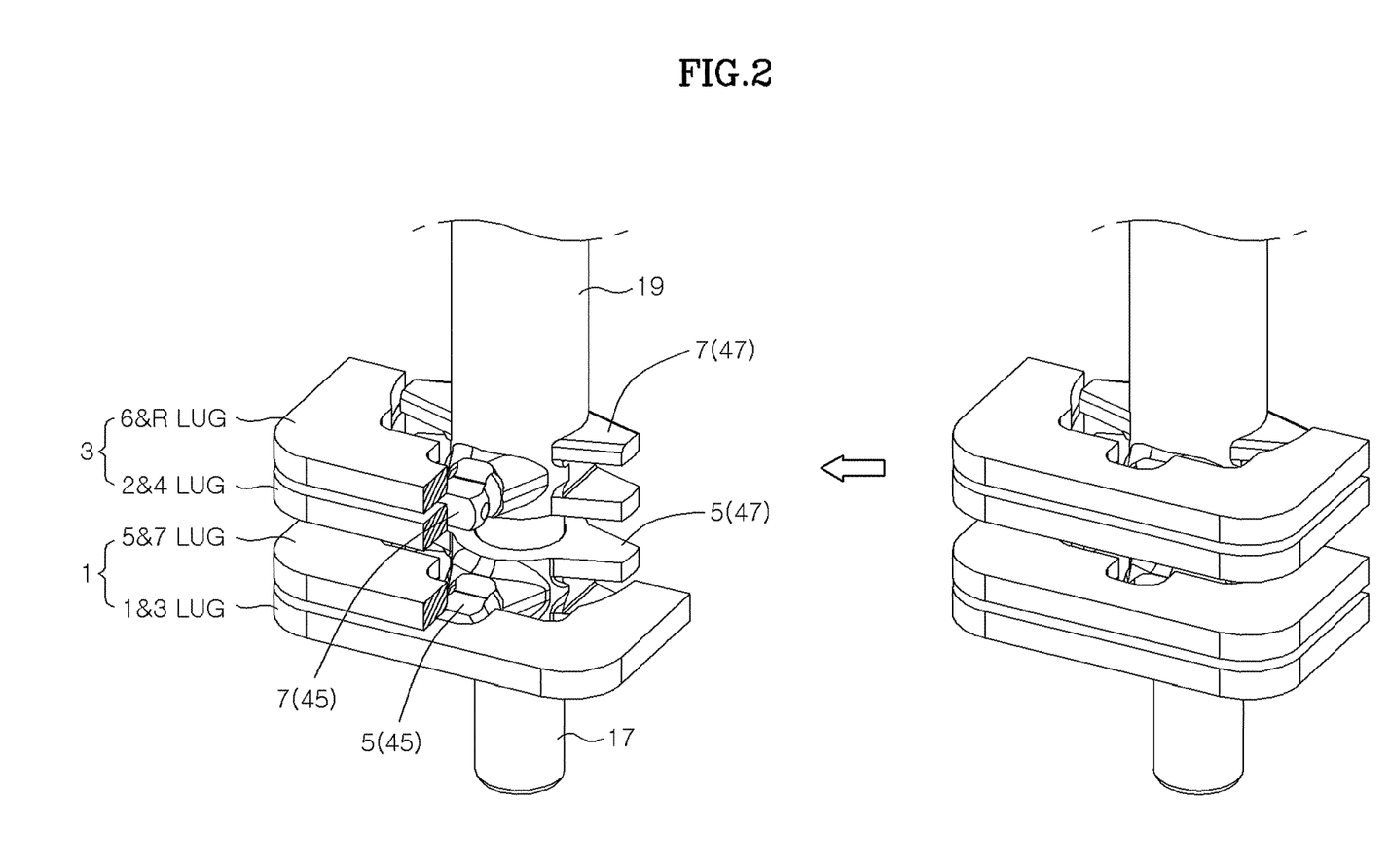
FIG. 2 is a view illustrating the lower portion of FIG. 1 with odd-numbered stage driven-shift elements and even-numbered stage driven-shift elements.

Referring to FIGS. 1 and 2, an exemplary embodiment of the present invention includes: a plurality of odd-numbered stage driven-shift elements 1 that makes engagement and disengagement at the odd-numbered shift stages by straight strokes; a plurality of even-numbered stage driven-shift elements 3 that makes engagement and disengagement at the even-numbered shift stages by straight strokes; an odd-numbered stage driving-shift elements 5 that is provided to selectively move straight any one of odd-numbered stage driven-shift elements 1 by a rotational motion path and a straight motion path perpendicularly crossing each other; an even-numbered stage driving-shift element 7 that is rotatably and coaxially disposed with odd-numbered stage driving-shift element 5 and provided to selectively move straight any one of even-numbered stage driven-shift elements 3 by a rotational motion path and a straight motion path perpendicularly crossing each other; an odd-numbered stage selecting actuator 9 that moves straight odd-numbered stage driving-shift element 5; an odd-numbered stage shifting actuator 11 that rotates odd-numbered stage driving-shift element 5; an even-numbered stage selecting actuator 13 that moves straight even-numbered stage driving-shift element 7; and an even-numbered stage shifting actuator 15 that rotates even-numbered stage driving-shift element 7.

The exemplary embodiment of the present invention further includes: an odd-numbered stage driving rod 17 where odd-numbered stage driving-shift element 5 is inserted; an even-numbered stage driving pipe 19 that is coaxially and rotatably fitted on the outer surface of odd-numbered stage driving rod 17 and has even-numbered stage driving shift element 7; an odd-numbered stage selecting-converting member that converts driving motion of odd-numbered stage selecting actuator 9 into longitudinal straight motion of odd-numbered stage driving rod 17; an odd-numbered stage shifting-converting member that converts driving motion of odd-numbered stage shifting actuator 11 into rotational motion of odd-numbered stage driving rod 17; an even-numbered stage selecting-converting member that converts driving motion of even-numbered stage selecting actuator 13 into longitudinal straight motion of even-numbered stage driving pipe 19; and an even-numbered stage shifting-converting member that converts driving motion of even-numbered stage shifting actuator 15 into rotational motion of even-numbered stage driving pipe 19.

That is, odd-numbered stage driving rod 17, odd-numbered stage selecting-converting member, and odd-numbered stage shifting-converting member are provided to appropriately transmit the operation of odd-numbered stage selecting actuator 9 and odd-numbered stage shifting actuator 11 to odd-numbered stage driving-shift element 5, and even-numbered stage driving pipe 19, even-numbered stage selecting-converting member, and even-numbered stage shifting-converting member are provided to appropriately transmit the operation of even-numbered stage selecting actuator 13 and even-numbered stage shifting actuator 15 to even-numbered stage driving shift element 7.

In this exemplary embodiment, odd-numbered stage selecting actuator 9 is implemented by a solenoid switch 21 that is a straight reciprocating member providing a straight stroke between two positions, and odd-numbered stage selecting-converting member includes an odd-numbered stage rotating link 23 that is rotated by the straight stroke of odd-numbered stage selecting actuator 9 and an odd-numbered stage selecting guide 25 that makes a straight stroke of odd-numbered stage driving rod 17 by receiving rotational motion of odd-numbered stage rotating rink 23.

That is, by using solenoid switch 21, which can perform only the straight motion between two positions, as odd-numbered stage selecting actuator 9, it is possible to achieve the selecting function for selecting any one of two odd-numbered stage driven-shift members 1 at a low cost.

Alternatively, it is possible to select three odd-numbered stage driven-shift members 1 at a low cost by using solenoid switch 21 that can perform only the straight motion between two positions and a neutral spring that elastically and neutrally supports the mid-point of the two positions as odd-numbered stage selecting actuator 9, or, although the cost may be increased, it is possible to use a linear motor that can perform control to a predetermined position.

Odd-numbered stage shifting actuator 11 is implemented by a motor 27 generating rotational force and odd-numbered stage shifting-converting member includes an odd-numbered stage shifting screw 29 that is rotated by rotational force of odd-numbered stage shifting actuator 11, an odd-numbered stage shifting-moving nut 31 that is moved straight by the rotational motion of odd-numbered stage shifting screw 29, and an odd-numbered stage shifting protrusion 33 that is provided to odd-numbered stage driving rod 17 and inserted in odd-numbered stage shifting-moving nut 31 such that odd-numbered stage driving rod 17 is rotated by straight motion of odd-numbered stage shifting-moving nut 31.

Further, a gear box that functions as a decelerator may be provided between motor 27 and odd-numbered stage shifting screw 29.

That is, as odd-numbered stage shifting screw 29 is rotated by the rotational force of motor 27 of odd-numbered stage shifting actuator 11, odd-numbered stage shifting-moving nut 31 connected thereto is guided to be able to move only straight by a transmission case, such that it moves straight and the straight motion moves odd-numbered stage shifting protrusion 33, and as a result, odd-numbered stage driving rod 17 is rotated.

In this exemplary embodiment, odd-numbered stage selecting guide 25 and odd-numbered stage shifting protrusion 33 protrude from odd-numbered stage driving rod 17 while being integrally formed with each other, and are fitted on the outer surface of odd-numbered stage driving rod 17.

Similar to odd-numbered stage, even-numbered stage selecting actuator 13 is implemented by a solenoid switch 21 providing a straight stroke between two positions, and even-numbered stage selecting-converting member includes an even-numbered stage rotating link 35 that is rotated by the straight stroke of even-numbered stage selecting actuator 13 and an even-numbered stage selecting guide 37 that makes a straight stroke of even-numbered stage driving pipe 19 by receiving rotational motion of even-numbered stage rotating rink 35.

Even-numbered stage shifting actuator 15 is implemented by a motor 27 generating rotational force and even-numbered stage shifting-converting member includes an even-numbered stage shifting screw 39 that is rotated by rotational force of even-numbered stage shifting actuator 15, an even-numbered stage shifting-moving nut 41 that is thread-fastened to even-numbered stage shifting screw 39 and moved straight by the rotational motion of even-numbered stage shifting screw 39, and an even-numbered stage shifting protrusion 43 that is provided to even-numbered stage driving rod 19 and inserted in even-numbered stage shifting-moving nut 41 such that even-numbered stage driving rod 19 is rotated by straight motion of even-numbered stage shifting-moving nut 41.

In this configuration, even-numbered stage selecting guide 37 and even-numbered stage shifting protrusion 43 protrude from even-numbered stage driving rod 19 and are integrally formed with even-numbered stage driving rod 19.

That is, even-numbered stage selecting guide 37 and even-numbered stage shifting protrusion 43 protrude from even-numbered stage driving pipe 19 fitted on the outer surface of odd-numbered stage driving rod 17 while being integrally formed with even-numbered stage driving pipe 19 such that they spatially occupy the same volume as the volume occupied by odd-numbered stage selecting guide 25 fitted on odd-numbered stage driving rod 17 and odd-numbered stage shifting protrusion 33, and accordingly, it is possible to achieve balanced and compact configuration for a shifting apparatus for a double clutch transmission.

Odd-numbered stage driving-shift element 5 includes a finger 45 that is fitted on the outer surface of odd-numbered stage driving rod 17 while protruding radially from odd-numbered stage driving rod 17, and inserted in odd-numbered stage driven-shift element 1, and an interlock preventing portion 47 that protrudes radially from odd-numbered stage driving rod 17 integrally with finger 45 and restrains a straight stroke of other odd-numbered stage driven-shift elements 1 that are not selected by finger 45 when finger 45 is shifted.

Further, even-numbered stage driving-shift element 7 includes a finger 45 that protrudes integrally and radially from even-numbered stage driving pipe 19 and is inserted in even-numbered stage driven-shift element 3, and an interlock preventing portion 47 that protrudes integrally and radially from even-numbered stage driving pipe 19 to restrain a straight stroke of other even-numbered stage shifting elements that are not selected by finger 45.

That is, similar to even-numbered stage selecting guide 37 and even-numbered stage shifting protrusion 43, finger 45 and interlock preventing portion 47 of even-numbered stage driving-shift element 7 are integrally formed with even-numbered stage driving pipe 19, such that they spatially occupy the same volume as the volume occupied by odd-numbered stage driving-shift element 5 fitted on odd-numbered stage driving rod 17 and are disposed in balance, and accordingly, it is possible to achieve a compact configuration for the entire shifting apparatus of a double clutch transmission.

Figure 3:
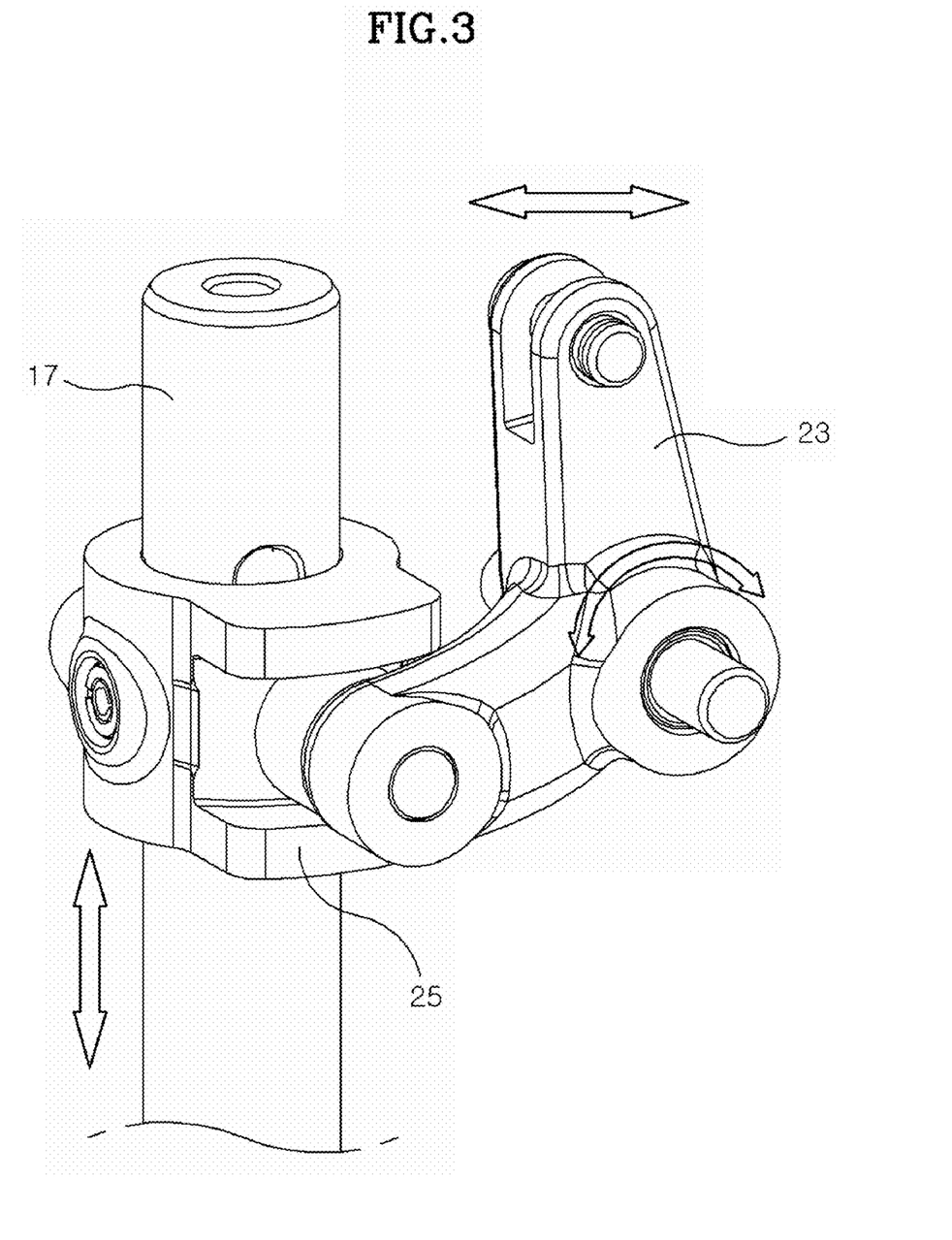
FIG. 3 is a view illustrating a selecting operation of an exemplary embodiment of the present invention.
Figure 4:
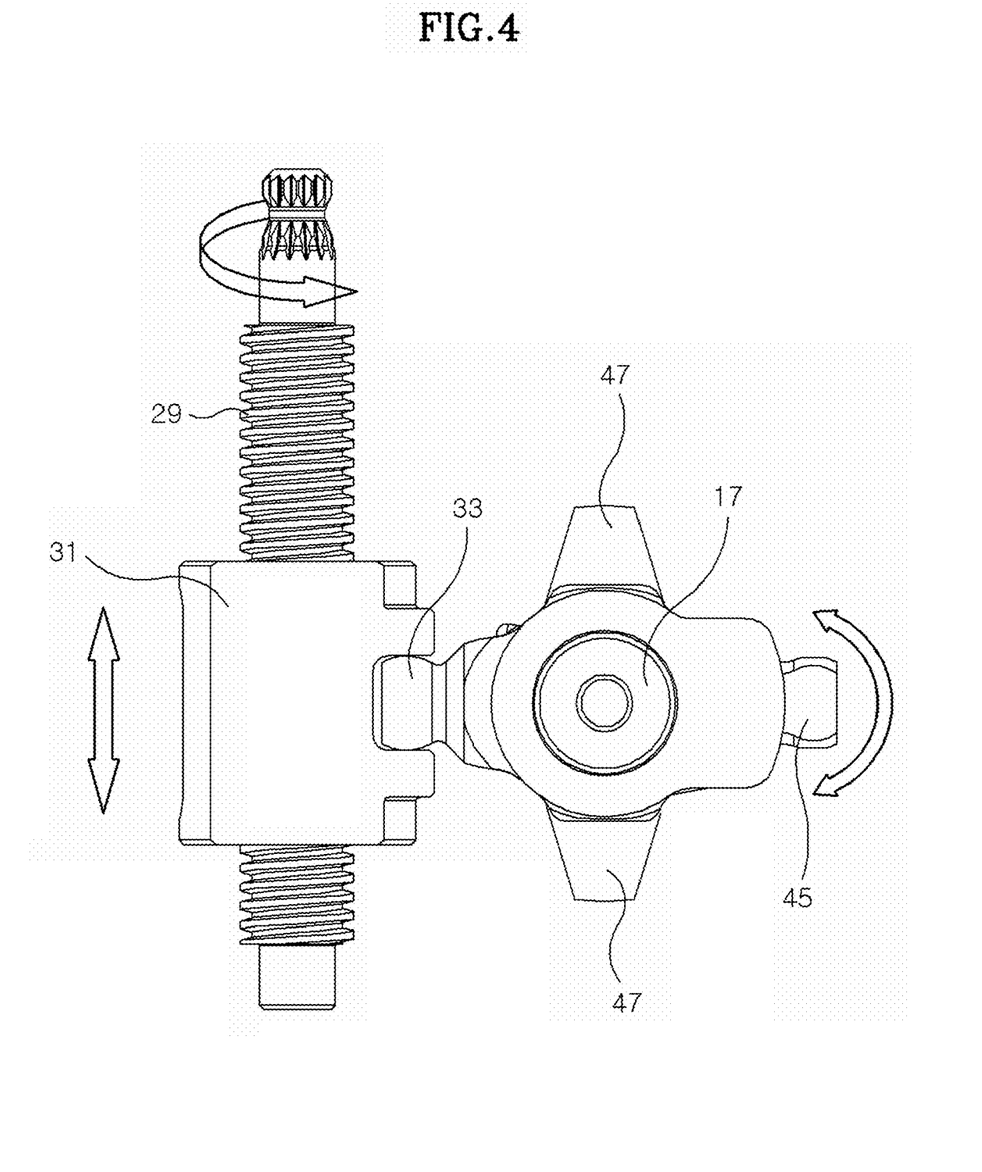
FIGS. 4 and 5 are views illustrating a shifting operation of an exemplary embodiment of the present invention.
Figure 5:
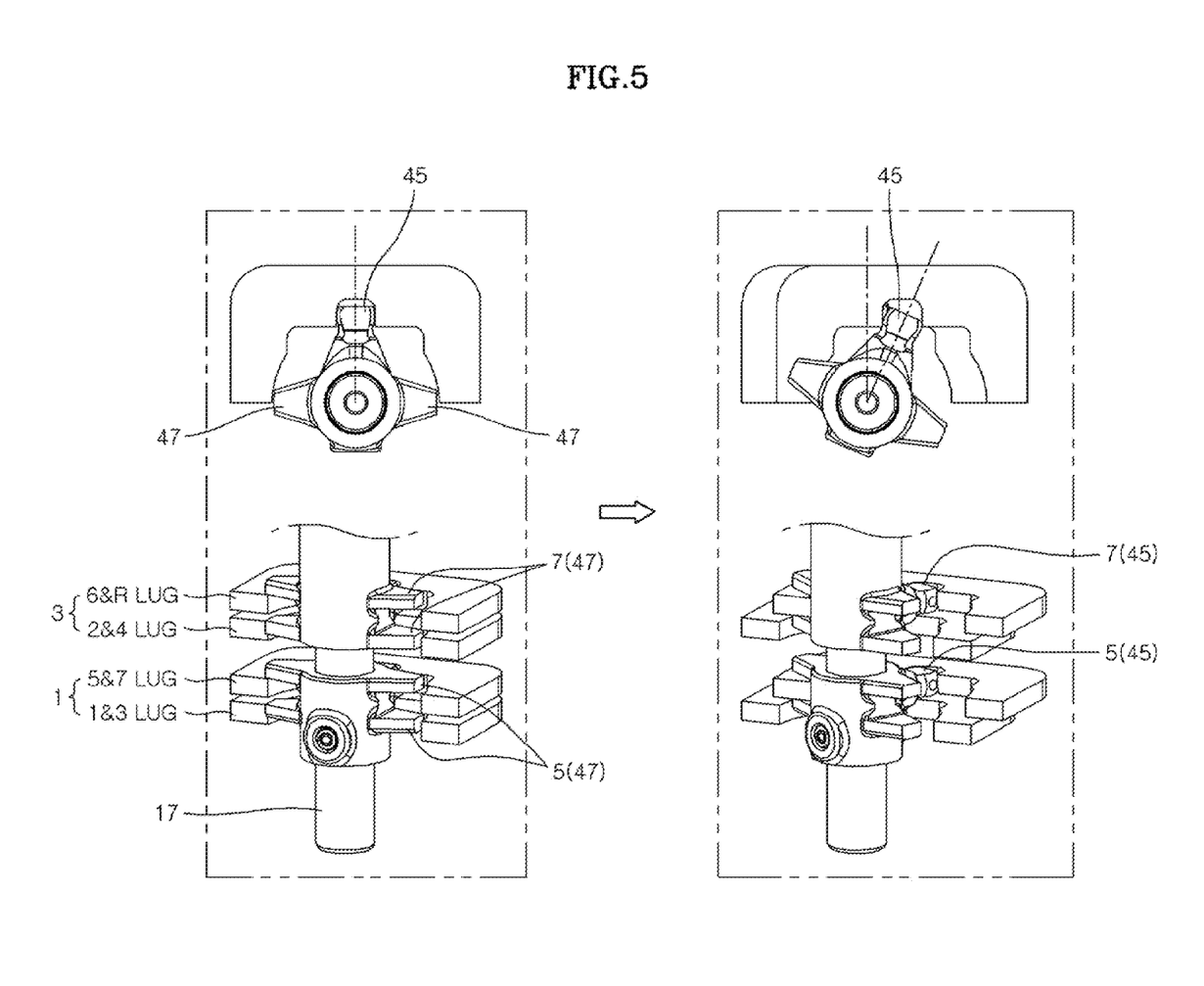

The operation of the shifting apparatus for a double clutch transmission according to the present invention having the above configuration is described hereafter with reference to FIGS. 3 to 5.

The shifting apparatus for a double clutch transmission of this exemplary embodiment can perform shifting by combination of selecting and shifting, similar to common manual transmissions.

That is, in the shift line of the odd-numbered stage and the shift line of the even-numbered shift line, a desired shift stage is engaged while the odd-numbered stage driven-shift elements and the even-numbered stage driven-shift elements move straight by selecting and shifting.

Since the shift line of the odd-numbered stage and the shift line of the even-numbered shift stage are configured to independently operate as described above, a pre-select function that can independently select and engage any one shift stage in the even-numbered shift line after any one shift stage in the odd-numbered shift line is engaged is implemented, such that shifting can be directly achieved by converting engagement and disengagement of two clutches of the double clutch transmission.

Describing the selecting operation by exemplifying the operations of odd-numbered stage driving rod 17, odd-numbered stage rotating link 23, and odd-numbered stage selecting guide 25 shown in FIG. 3, as odd-numbered stage rotating link 23 is rotated by straight motion of odd-numbered stage selecting actuator 9, the rotational force is applied to odd-numbered stage selecting guide 25, such that odd-numbered stage selecting guide 25 move straight odd-numbered stage driving rod 17 in the longitudinal direction.

As odd-numbered stage driving rod 17 moves straight, odd-numbered stage driving-shift elements 5 inserted and fixed in odd-numbered stage driving rod 17 move straight and finger 45 selects one of odd-numbered stage driven-shift elements 1.

In the above state, shifting is achieved as follows shown in FIG. 4. As motor 27 which is odd-numbered stage shifting actuator 11 rotates and odd-numbered stage shifting screw 29 rotates, odd-numbered stage shifting-moving nut 31 moves straight, odd-numbered stage shifting protrusion 33 inserted in odd-numbered stage shifting-moving nut 31 and fixed to odd-numbered stage driving rod 17 correspondingly rotates, and odd-numbered stage driving rod 17 rotates, such that, as shown in FIG. 5, odd-numbered stage driven-shift element 1 selected by finger 45 is moved straight and the gear of a desired shift stage is engaged.

Figure 6:
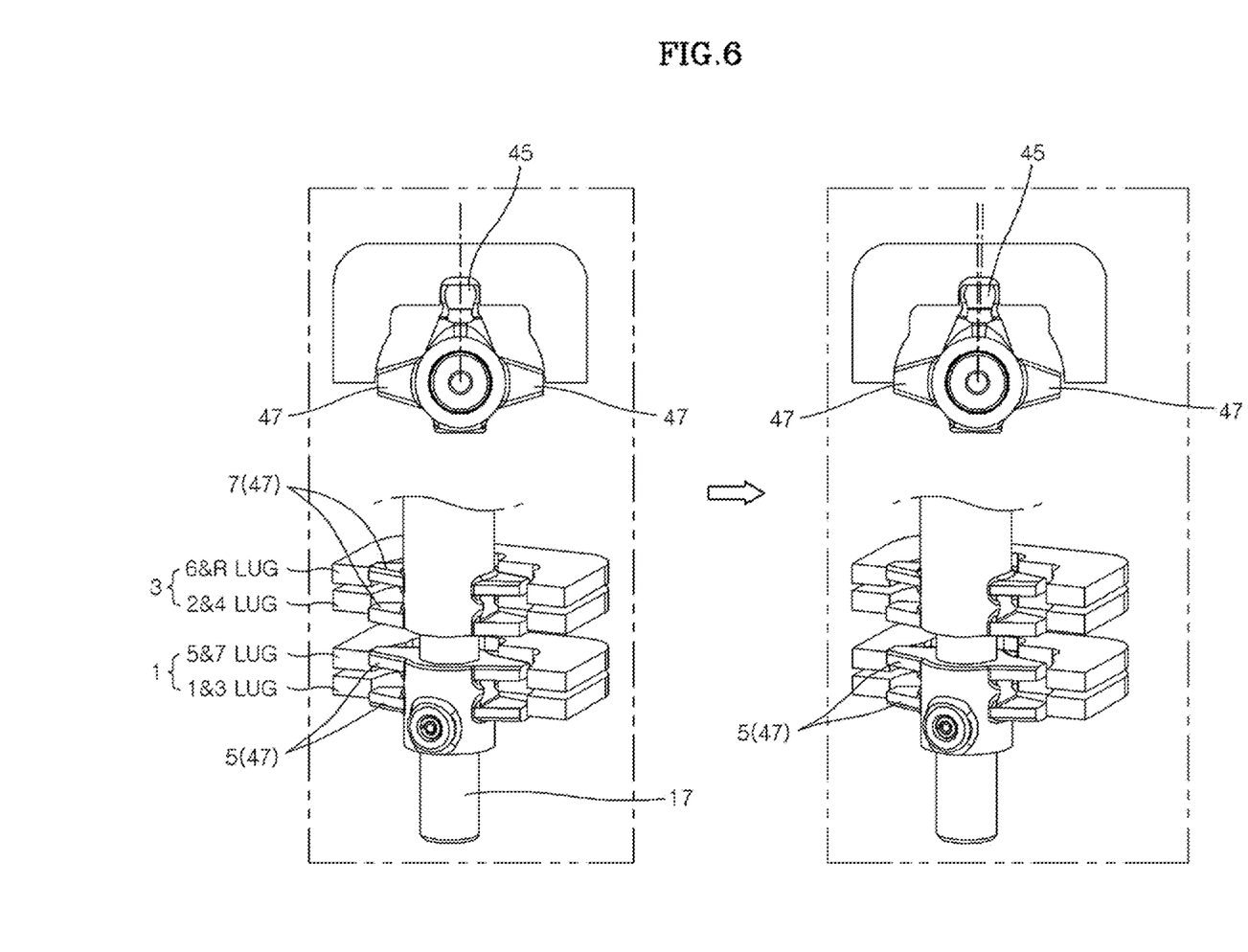
FIG. 6 is a view illustrating an interlock prevention function of an exemplary embodiment of the present invention.

In the above operation, interlock due to positional error caused in the selecting operation should be prevented. Accordingly, when there occurs an error in the position of finger 45 in the selecting operation and the 1&3 stage lug and 5&7 stage lug, which are odd-numbered stage driven-shift element, simultaneously receive force in the straight motion direction in the shifting operation, as shown in FIG. 6, the straight motion of the 1&3 stage lug and 5&7 stage lug is prevented by interlock preventing portion 47, thereby preventing interlock.

Further, interlock in which two or more shift stages are simultaneously engaged in the one shift line should be prevented. Accordingly, since the movement of finger 45 that is rotated with rotation of odd-numbered stage driving rod 17 and the movement of odd-numbered stage driven-shift elements 1 moving straight are achieved in engagement without an intentionally predetermined large gap between two elements, other odd-numbered stage driven-shift elements cannot be selected unless odd-numbered stage driven-shift element that has engaged a shift stage returns to the neutral position, such that interlock preventing function in which only one desired gear can be engaged in one shift line is achieved.

That is, after the 1&3 stage lug which is one of the odd-numbered stage driven-shift elements moves straight, the 5&7 stage lug cannot additionally move straight, such that interlock does not occur in one shift line.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A shifting apparatus for a double clutch transmission that divides a plurality of shift stages having different gear ratios into integer number of continuous shift stages in accordance with the order of the gear ratios, the double clutch transmission comprising:
    a plurality of odd-numbered stage driven-shift elements that makes engagement or disengagement at odd-numbered shift stages by straight strokes;
    a plurality of even-numbered stage driven-shift elements that makes engagement or disengagement at even-numbered shift stages by straight strokes;
    odd-numbered stage driving-shift elements that are provided to selectively move straight any one of the odd-numbered stage driven-shift elements by a rotational motion path or a straight motion path perpendicularly crossing each other;
    even-numbered stage driving-shift elements that are disposed rotatably and coaxially with the odd-numbered stage driving-shift elements and provided to selectively move straight any one of the even-numbered stage driven-shift elements by a rotational motion path or a straight motion path perpendicularly crossing each other;
    an odd-numbered stage selecting actuator that supplies the straight motion path to the odd-numbered stage driving-shift elements;
    an odd-numbered stage shifting actuator that supplies the rotary motion path to the odd-numbered stage driving-shift elements;
    an even-numbered stage selecting actuator that supplies the straight motion path to the even-numbered stage driving-shift elements; and
    an even-numbered stage shifting actuator that supplies the rotary motion path to the even-numbered stage driving-shift elements.

2. The shifting apparatus for the double clutch transmission as defined in claim 1, further comprising:
    an odd-numbered stage driving rod that is provided with the odd-numbered stage driving-shift elements and receives the straight motion path from the odd-numbered stage selecting actuator and the rotary motion path from the odd-numbered stage shifting actuator;
    an even-numbered stage driving pipe that is rotatably and coaxially fitted on the outer surface of the odd-numbered stage driving rod, receives the straight motion path from the even-numbered stage selecting actuator and the rotary motion path from the even-numbered stage shifting actuator, and has the even-numbered stage driving-shift elements;
    an odd-numbered stage selecting-converting member coupled to the odd-numbered stage selecting actuator and the odd-numbered stage driving rod such that the odd-numbered stage selecting-converting member converts driving motion of the odd-numbered stage selecting actuator into the straight motion path of the odd-numbered stage driving rod;
    an odd-numbered stage shifting-converting member coupled to the odd-numbered stage shifting actuator and the odd-numbered stage driving rod such that the odd-numbered stage shifting-converting member converts driving motion of the odd-numbered stage shifting actuator into the rotational motion path of the odd-numbered stage driving rod;
    an even-numbered stage selecting-converting member coupled to the even-numbered stage selecting actuator and the even-numbered stage driving pipe such that the even-numbered stage selecting-converting member converts driving motion of the even-numbered stage selecting actuator into the straight motion path of the even-numbered stage driving pipe; and
    an even-numbered stage shifting-converting member coupled to the even-numbered stage shifting actuator and the even-numbered stage driving pipe such that the even-numbered stage shifting-converting member converts driving motion of the even-numbered stage shifting actuator into the rotational motion path of the even-numbered stage driving pipe.

3. The shifting apparatus for the double clutch transmission as defined in claim 2, wherein
    the odd-numbered stage selecting actuator is implemented by a straight reciprocating member providing a straight stroke between two positions,
    the odd-numbered stage selecting-converting member includes an odd-numbered stage rotating link that is rotated by the straight stroke of the odd-numbered stage selecting actuator and an odd-numbered stage selecting guide that makes a straight stroke of the odd-numbered stage driving rod by receiving rotational motion of the odd-numbered stage rotating link,
    the odd-numbered stage shifting actuator is implemented by a motor generating rotational force,
    the odd-numbered stage shifting-converting member includes an odd-numbered stage shifting screw that is rotated by rotational force of the odd-numbered stage shifting actuator, an odd-numbered stage shifting-moving nut engaged with the odd-numbered stage shifting screw and moved straight by rotational motion of the odd-numbered stage shifting screw, and an odd-numbered stage shifting protrusion that is provided to the odd-numbered stage driving rod and inserted in the odd-numbered stage shifting-moving nut such that the odd-numbered stage driving rod is rotated by straight motion of the odd-numbered stage shifting-moving nut.

4. The shifting apparatus for the double clutch transmission as defined in claim 3, wherein
    the odd-numbered stage selecting guide and the odd-numbered stage shifting protrusion protrude from the odd-numbered stage driving rod while being integrally formed with each other, and are fitted on the outer surface of the odd-numbered stage driving rod.

5. The shifting apparatus for the double clutch transmission as defined in claim 4, wherein the odd-numbered stage selecting guide and the odd-numbered stage shifting protrusion are aligned symmetric in a circumferential direction with respect to the center axis of the odd-numbered stage driving rod.

6. The shifting apparatus for the double clutch transmission as defined in claim 2, wherein
    the even-numbered stage selecting actuator is implemented by a straight reciprocating member providing a straight stroke between two positions,
    the even-numbered stage selecting-converting member includes an even-numbered stage rotating link that is rotated by the straight stroke of the even-numbered stage selecting actuator and an even-numbered stage selecting guide that makes a straight stroke of the even-numbered stage driving pipe by receiving rotational motion of the even-numbered stage rotating link,
    the even-numbered stage shifting actuator is implemented by a motor generating rotational force, the even-numbered stage shifting-converting member includes an even-numbered stage shifting screw that is rotated by rotational force of the even-numbered stage shifting actuator, an even-numbered stage shifting-moving nut engaged with the even-numbered stage shifting screw and moved straight by rotational motion of the even-numbered stage shifting screw, and an even-numbered stage shifting protrusion that is provided to the even-numbered stage driving pipe and inserted in the even-numbered stage shifting-moving nut such that the even-numbered stage driving pipe is rotated by straight motion of the even-numbered stage shifting-moving nut.

7. The shifting apparatus for the double clutch transmission as defined in claim 6, wherein the even-numbered stage selecting guide and the even-numbered stage shifting protrusion protrude from the even-numbered stage driving pipe and are integrally formed with the even-numbered stage driving pipe.

8. The shifting apparatus for the double clutch transmission as defined in claim 7, wherein the even-numbered stage selecting guide and the even-numbered stage shifting protrusion are aligned symmetric in a circumferential direction with respect to the center axis of the even-numbered stage driving pipe.

9. The shifting apparatus for the double clutch transmission as defined in claim 2, wherein one of the odd-numbered stage driving-shift elements includes a finger that is fitted on the outer surface of the odd-numbered stage driving rod while protruding radially from the odd-numbered stage driving rod, and inserted in the odd-numbered stage driven-shift element, and an interlock preventing portion that protrudes radially from the odd-numbered stage driving rod integrally with the finger and restrains a straight stroke of other odd-numbered stage driven-shift elements that are not selected by the finger when finger is shifted.

10. The shifting apparatus for the double clutch transmission as defined in claim 2, wherein one of the even-numbered stage driving-shift elements includes a finger that protrudes integrally and radially from the even-numbered stage driving pipe and is inserted in the even-numbered stage driven-shift element, and an interlock preventing portion that protrudes integrally and radially from the even-numbered stage driving pipe to restrain a straight stroke of other even-numbered stage shifting elements that are not selected by the finger.

* * * * *